United States Patent
Fischer et al.

(10) Patent No.: US 7,095,848 B1
(45) Date of Patent: Aug. 22, 2006

(54) POWER UP RESET CIRCUIT FOR LINE POWERED CIRCUIT

(75) Inventors: Jonathan Herman Fischer, Blandon, PA (US); Lane A. Smith, Easton, PA (US); Michael G. Williams, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/366,614

(22) Filed: Aug. 3, 1999

(51) Int. Cl.
*H04M 1/00* (2006.01)
*H04M 9/00* (2006.01)
*H04M 9/08* (2006.01)

(52) U.S. Cl. .................. 379/412; 379/322; 379/413

(58) Field of Classification Search ........... 379/29.3, 379/29.4, 399.01, 412, 413, 413.02, 24, 322–324
See application file for complete search history.

(56) References Cited

U.S. PATENT DOCUMENTS

| | | | | |
|---|---|---|---|---|
| 5,471,524 A | * | 11/1995 | Colvin et al. | |
| 5,783,999 A | * | 7/1998 | Price et al. | |
| 6,149,319 A | * | 11/2000 | Richter et al. | ............. 713/300 |
| 6,204,706 B1 | * | 3/2001 | Horvath | |
| 6,411,680 B1 | * | 6/2002 | Rousse | |

FOREIGN PATENT DOCUMENTS

FR     2495866    * 12/1980

* cited by examiner

*Primary Examiner*—Duc Nguyen

(57) ABSTRACT

A system for powering up an electronic circuit with telephone line power such that the electronic circuit does not enter a lockup state. The system includes a voltage detector that measures the voltage across the telephone line and a switch coupled with the voltage detector. The voltage detector generates a Reset signal when the measured voltage exceeds a selected voltage level, and the switch applies power to the electronic circuit in response to the generated Reset signal.

21 Claims, 2 Drawing Sheets

POWER UP RESET CIRCUIT FOR LINE POWERED CIRCUIT

REFERENCE TO RELATED APPLICATIONS

This application is also related to and incorporates by reference the commonly assigned U.S. patent application Ser. No. 09/366,615, for "Micropower, Minimal Area DC Sensing Power-Up Reset Circuit", filed the same day herewith.

FIELD OF THE INVENTION

This invention relates to apparatus and methods for effectively powering up an electronic circuit using telephone line power. Particularly, the invention concerns apparatus and methods for powering up a data access arrangement using telephone line power.

BACKGROUND OF THE INVENTION

A data access arrangement (DAA) provides an interface between a telephone line and an electronic device that connects to the telephone line. A telephone line to a residence or business can have a common mode voltage in excess of 100V, while most electronic circuit devices typically can not operate at voltages exceeding 5 volts. Accordingly, in order to prevent damage to the telephone network, the DAA must isolate high voltages on the telephone line from any standard electronic device connected to the telephone line. Standard electronic devices are typically powered from the main line, e.g. from wall-mounted A.C. outlets. The data access arrangement, in addition to high voltage isolation, must also transmit and receive electrical communication signals between the central office and the electronic device connected to the telephone line.

A DAA can be constructed using a transformer that operates as a band pass filter and that isolates the electronic device from the telephone line. Alternative DAA solutions use active circuits to isolate the main line powered electronic device from the telephone line. Moreover, those DAAs having active circuits can be powered from main line power or the DAA can be powered from the telephone line itself. Powering a DAA from the telephone line, instead of the main line, would be advantageous because it would reduce the total power requirements of the DAA. In the past, however, DAAs powered from the telephone line have proved problematic.

One problem with powering a DAA by telephone line power is that, after connecting to the telephone line, the DAA must enter a predictable state and it must be ready to transmit and receive when the DAA is connected to certain devices, such as a modem. Secondly, the DC current drain of a line-powered DAA is strictly limited by national and international specifications. For example, telephone line operators typically specify the amount of DC current which can be drawn from their telephone lines during an on-hook state. If a DAA exceeds the national and international specifications, the DAA can not be legally connected to a telephone line. These limitations on current draw have typically prevented telephone line powered DAAs.

Furthermore, telephone line powered electronic circuits, in general, can suffer from a lockup condition if the electronic circuit is powered up by the telephone line improperly. In particular, the digital logic in the telephone line powered electronic circuit can appear as a variable resistor that depends upon the voltage across the telephone line. The variable resistor of the digital logic can appear as a short to the telephone line power, thereby preventing the line powered electronic circuit from being powered at acceptable voltage levels. As a result of being improperly powered, the digital logic enters a lockup condition and the telephone line powered electronic circuit fails to operate properly.

Accordingly, there is a need for an apparatus and method that effectively energizes an electronic circuit, such as a DAA, with telephone line power.

SUMMARY OF THE INVENTION

An electronic circuit can be powered up by a telephone line without causing lockup, according to the invention, by detecting the voltage across the telephone line and by applying telephone line power to the electronic circuit based on a characteristic of the detected voltage.

Another embodiment of the invention provides for an apparatus that powers the electronic circuit with telephone line power. The apparatus includes a voltage detector and a switch. The voltage detector measures the voltage across the telephone line and generates a signal based on a characteristic of the measured voltage. The switch then applies telephone line power to the electronic circuit in response to the signal generated by the voltage detector.

BRIEF DESCRIPTION OF THE DRAWINGS

The features and advantages of the invention will be apparent from the following description, as illustrated in the accompanying Figures in which like reference characters refer to the same elements throughout the different views.

DETAILED DESCRIPTION

Figure 1:
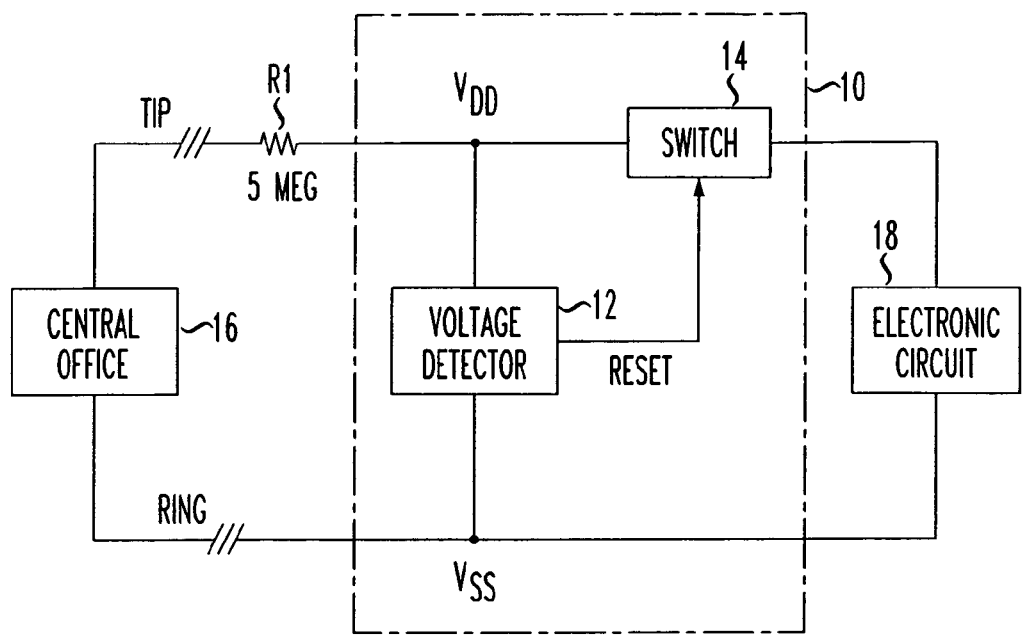
FIG. 1 is a schematic of an apparatus for powering an electronic circuit with telephone line power, in accordance with the invention.

FIG. 1 schematically shows an apparatus 10 for powering an electronic circuit 18 with telephone line power received from a central office 16, in accordance with the invention. The apparatus 10 includes a voltage detector 12 that measures the voltage across the telephone line, and a switch 14. The voltage detector 12 also generates a Reset signal based on a characteristic of the measured voltage. The switch 14 applies telephone line power to the electronic circuit 18 in response to the Reset signal from the voltage detector 12.

The voltage detector 12 generates the Reset signal based on characteristics of the measured voltage, such as the actual voltage level or the rate of change of the voltage level over time. In one embodiment of the invention, the voltage detector 12 generates a Reset signal when the measured voltage exceeds a selected voltage level. In an alternative embodiments of the invention, the voltage detector 12 can generate a Reset signal based upon the rate at which the voltage is rising over time.

The apparatus 10 overcomes problems typically associated with telephone line powered electronic circuits. For example, it is known that line powered circuits require a high impedance on-hook termination resistor R1 to be placed between the high voltages from the central office and the electronic circuit. The high impedance resistor R1 limits current draw from the central office 16 in order to comply with international and national standards on current drain during off-hook and on-hook states. The inventors discovered, however, that the resistance of the electronic circuit 18 can vary as a function of the telephone line voltage if the electronic circuit includes digital logic. The dynamic resistance of the electronic circuit 18 and the high impedance resistor R1 form a voltage divider during power up of the electronic circuit 18. The combined dynamic resistance of the on-hook electronic circuit 18 and the on-hook termination resistor R1 can prevent the voltage Vdd, at the input to circuit 18, from reaching its proper value.

If the voltage Vdd fails to reach a minimum voltage level (typically 1.4 volts), then the CMOS logic in electronic circuit 18 can enter a lockup state which drains current through the electronic circuit. The current drain through circuit 18 is disastrous for line powered circuitry because it causes the circuit 18 to operate improperly, and the current drain fails international and national standards.

The invention, as illustrated in FIG. 1, overcomes the obstacles created by the dynamic resistance of the electronic circuit 18 and the termination resistor R1, by only connecting the electronic circuit 18 to the telephone line power after the voltage level from the central office 16 is high enough for proper operation of the on-hook electronic circuit 18.

In particular, the voltage detector 12 controls the switch 14. The rising trip point of the voltage detector 12 is set to a point to insure that Vdd is high enough for proper operation of the on-hook electronic circuit 18. When the voltage detector 12 trips, the Reset signal turns on the switch 14 and provides telephone line power to the electronic circuit 18 at a voltage level that ensures proper operation of the on-hook electronic circuit.

In one aspect of the invention, the apparatus 10 can be used in a line powered Data Access Arrangement (DAA) intended for international voiceband modems. In this aspect of the invention, the electronic circuit 18 is formed of sections of the DAA, such as the Analog to Digital converter, the Digital to Analog Converter, the caller ID functionality, and other features. At least one section of the electronic circuit 18 typically includes a CMOS electronic circuit. In operation, the voiceband modem begins in an on-hook state and telephone line power is used to energize and initialize sections of the modem once the telephone line power exceeds a selected voltage level. When a data connection is to be made, the DAA enters an off-hook state. The total cost of the voiceband modem is advantageously reduced by powering as much of the DAA as possible from the phone line.

In general, the apparatus 10 of FIG. 1 powers the electronic circuit 18 with telephone line power from a central office 16 by first detecting the voltage across the telephone line and by then applying telephone line power to the electronic circuit 18 when the detected voltage exceeds a selected voltage level.

Figure 2:
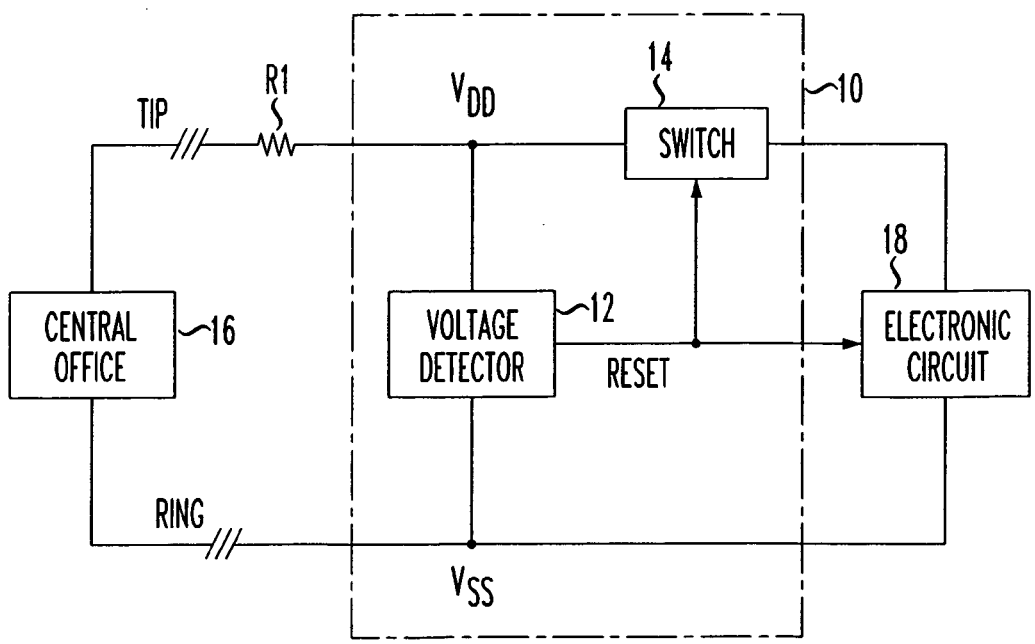
FIG. 2 is a shows an alternative embodiment of the apparatus of FIG. 1.

FIG. 2 schematically shows an alternative embodiment comprising the apparatus of FIG. 1 modified to have a Reset signal operably coupling the voltage detector 12 with the electronic circuit 18. In particular, the Reset signal from the voltage detector 12 is output to the switch 14 and to the electronic circuit 18. The Reset signal is used to gate the logic of the on-hook electronic circuit 18. Gating the logic of the electronic circuit 18 helps insure that the resistance of the electronic circuit 18 is very high impedance during power up. By insuring high impedance of the electronic circuit 18, a lockup state in the electronic circuit can be prevented during power up.

In particular, the voltage detector 12 outputs the Reset signal to the switch 14 and to the electronic circuit 18. The Reset signal remains in a first state while the input voltage to detector 12 can not enough to ensure proper operation of the digital logic circuits in the electronic circuit 18. The Reset signal enters a second state when the input voltage to detector 12 is high enough to ensure proper operation of the digital logic circuits in the electronic circuit 18. In the first state of the Reset signal, the switch 14 is turned off while the electronic circuit is placed in a reset state. That is, the logic of the electronic circuit is gated to ensure a high impedance state. In the second state of the Reset signal, the switch 14 is turned on and the electronic circuit 18 is taken out of a reset state and enters an active state.

The input voltage to detector 12 is considered high enough to ensure proper operation on the digital logic circuits in the electronic circuit 18 when it exceeds the absolute value of one PMOS threshold voltage (i.e. "Vthp") plus one NMOS threshold voltage (i.e. "Vthn"). The values for Vthp and Vthn are known to vary based upon the process used in fabricating the digital logic in the electronic circuit 18 and based upon environmental conditions experienced by the electronic circuit 18 during operation. When the input to voltage detector 12 is at least 200 mV above Vthp+Vthn, defined as the "trip point" for the voltage detector 12, the Reset signal from detector 12 changes from the first state to the second state.

To avoid potential system oscillations upon power up and to increase the voltage detector's noise immunity there is preferably hysteresis between the rising and falling trip points. For example, the hysteresis between the rising and falling trip point for the voltage detector 12 can be designed to be at least 300 mV. Finally, according to one embodiment, the voltage detector consumes less than 1 uA DC current, which is necessary to help meet the on-hook (or low power) mode current budget specified by the telephone operators.

Figure 3:
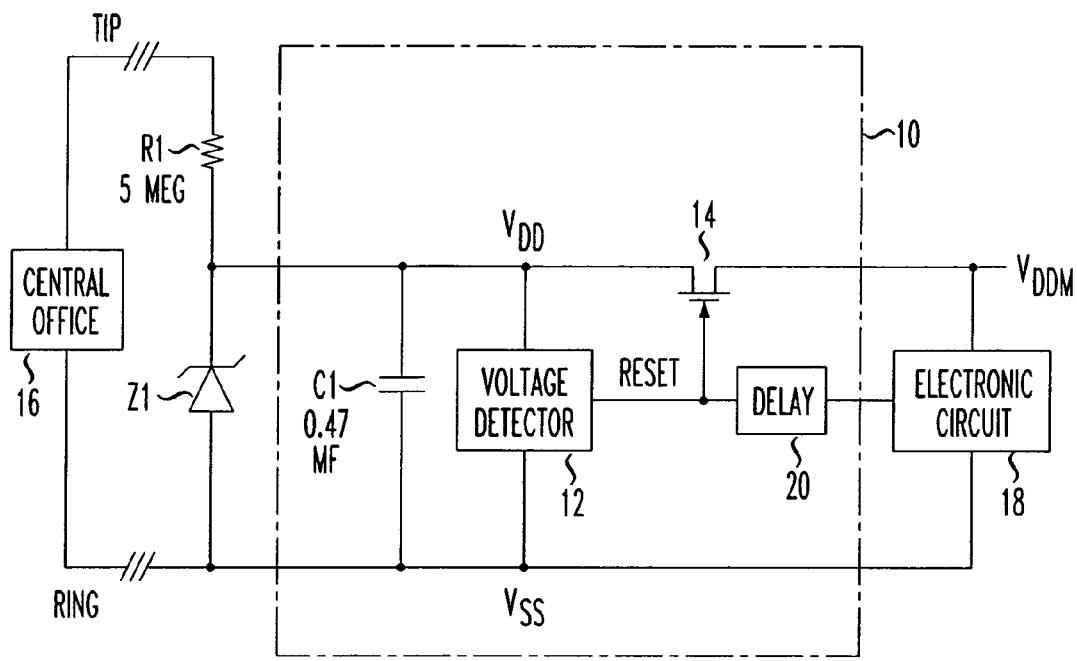
FIG. 3 schematically illustrates additional features in the apparatus of FIG. 2.

FIG. 3 schematically illustrates other features of the apparatus 10 for powering the electronic circuit 18 with telephone line power 16. The line power from the central office is conditioned by an on-hook termination resistor R1 and a zener diode ZI before entering the apparatus 10. The apparatus 10 includes a voltage detector 12, a switch 14, and a delay element 20 operably coupled between the detector 12 and the circuit 18, and an electronic charge storage device C1.

The voltage detector 12 measures the voltage across the telephone line and changes the state of the Reset signal when the measured voltage across the telephone line exceeds a selected voltage. The switch 14 applies telephone line power to the electronic circuit 18 in response to the Reset signal state from the voltage detector 12. The delay element 20 delays application of the change in the state of the Reset signal to the electronic circuit 18, such that the digital logic in the circuit 18 is removed from its reset state after the switch 14 is activated. In particular, the delay element 20 typically keeps circuit 18 in a reset mode for approximately 100 ns after switch 14 closes. This causes the logic in circuit 18 to be in a high-impedance state when powered-up. The charge storage device C1, such as a capacitor, accumulates and dissipates electronic charge across the electronic circuit 18.

When Vdd is less than the trip point of the voltage detector 12, the Reset signal remains in the first state. While the Reset signal remains in the first state, switch 14 is open and charge storage device C1 accumulates charge. Once Vdd exceeds the trip point of the voltage detector 12, the Reset signal changes to the second state wherein switch 14 is closed and the reset signal to the circuit 18 is turned off after a time delay, thereby enabling electronic circuit 18. The closing of the switch 14 allows the charge storage device C1 to help supply an inrush current used by circuit 18 to bring Vddm up to Vdd. Dissipating the charge from C1 aids in keeping Vdd above a voltage level sufficient to prevent lockup as the electronic circuit 18 powers up. C1 provides a low impedance charge source to quickly force the voltage across circuit 18 above the critical supply voltage when switch 14 closes.

The delay element 20 maintains application of the Reset signal to the electronic circuit 18 for a time of approximately 100 nano-seconds after the switch 14 is closed. The delayed Reset signal to the electronic circuit 18 gates the logic of the on-hook electronic circuit to insure that the resistance of the electronic circuit 18 is very high impedance during power up. The combined action of the high impedance state of the electronic circuit 18 and the charge supplied by the storage device C1 help to prevent a lockup state from occurring in the electronic circuit 18.

Figure 4:
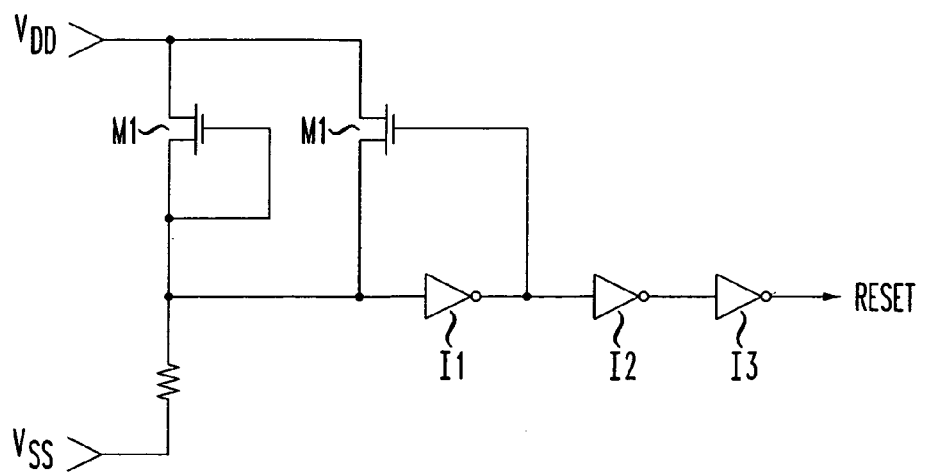
FIG. 4 shows an exemplary voltage detector circuit of the apparatus of FIG. 1.

FIG. 4 shows an exemplary voltage detector circuit 12. The voltage detector circuit generates a Reset signal in response to the voltage difference between Vdd and Vss. Preferably, the DC current drain through the detector 12 is less than 1 micro-amp. The illustrated voltage detector circuit 12 is a DC sensing power-up reset circuit. Alternative embodiments and further details of the DC sensing power-up reset circuit are disclosed in the commonly-owned, U.S. Patent Application Ser. No. 09/366,615, entitled "Micropower, Minimal Area DC Sensing Power-Up Reset Circuit", filed on the same day herewith, which is incorporated by reference herein.

As shown in FIG. 4, the exemplary voltage detector includes switches M1 and M2, inverters I1, I2 and I3, and a high impedance resistor R2. The switch M1 and the resistor R2 are placed in series between Vdd and Vss. The gate of switch M1 is coupled to the source of switch M1. Switch M2 is connected in parallel across switch M1. The sources of switches M1 and M2 are coupled to the input of inverter I1. The output of inverter I1 is connected to the input of inverter I2 and the gate of switch M2. The output of inverter I2 is connected to the input of inverter I3. The Reset signal is generated at the output of Inverter I3. The use of a single resistor R2 limits the DC current in the only DC current path to less than 1 micro-amp.

In operation, until Vdd is high enough to turn on switch M1, resistor R2 pulls the input of inverter I1 to logic low. The choice of connecting the input of I1 to Vss guarantees that the output of inverter I2 is low and inverter I3 is high, which in turn guarantees that switch 14 of FIG. 1 is turned off prior to the voltage Vdd reaching the trip point of voltage detector 12. Accordingly, when Vdd is less than the trip point of voltage detector 12, switch 14 is off and the electronic device 18 receives no power from the telephone line. This helps to prevent a low voltage lockup state in the electronic device 18.

Once Vdd reaches the trip point of the voltage detector 12, switch M1 turns on and the input to inverter I1 rises to a voltage greater than I's trip point. At this point in time, the output of inverter I1 goes low and turns on switch M2, which pulls the input to inverter I1 close to Vdd. This in turn, forces the output of inverters I2 and I3 change state and turn on switch 14 of FIG. 1, and to turn off the Reset signal to the electronic circuit 18. Turning on switch 14 powers the electronic device with the telephone line power. Turning off the Reset signal to the circuit 18 enables the normal mode of operation of the logic circuits within the circuit 18. The Reset signal to the electronic circuit 18 is typically maintained for approximately 100 nano-seconds by the delay block 20 following the closing of the switch 14 in order to allow the circuits to reset while the power to circuit 18 (i.e. VDDM) stabilizes.

While the invention has been shown and described having reference to specific preferred embodiments, those skilled in the art will recognize that variation in form and detail may be made without departing from the spirit and scope of the invention. Thus, specific details of the disclosure herein are not intended to be necessary limitations on the scope of the invention other than as required by the prior art.

We claim:

1. A method of powering an electronic circuit with a telephone line, comprising:
    conditioning the voltage across the telephone line;
    detecting the conditioned voltage; and
    applying telephone line power to the electronic circuit based on a characteristic of the detected conditioned voltage, said characteristic comprising the detected voltage exceeding the absolute value of one P-channel threshold voltage plus one N-channel threshold voltage in the electronic circuit.

2. The method according to claim 1, further comprising the step of applying telephone line power to the electronic circuit when the detected conditioned voltage exceeds a selected voltage level.

3. The method according to claim 1, wherein the conditioned voltage across the telephone line is detected while the telephone line is in an on-hook state.

4. The method according to claim 1, wherein the conditioned voltage across the telephone line is detected while limiting the dc current drain from the telephone line to <1.0 microamps.

5. The method according to claim 2, wherein the step of applying telephone line power further includes the step of applying telephone line power when the detected conditioned voltage exceeds the voltage necessary for proper operation of a digital logic circuit in the electronic circuit.

6. A method of powering an electronic circuit with a telephone line, comprising:
    detecting the voltage across the telephone line, and
    applying telephone line power to the electronic circuit based on a characteristic of the detected voltage;
    wherein the step of applying telephone line power further includes the step of applying telephone line power when the detected voltage exceeds the absolute value of one P-channel threshold voltage plus one N-channel threshold voltage in the electronic circuit.

7. The method according to claim 1, further comprising the step of applying a reset signal to the electronic circuit.

8. The method according to claim 7, further comprising the step of turning-off the reset signal to the electronic circuit after the step of applying telephone line power to the electronic circuit.

9. The method according to claim 1, further comprising the step of entering an active state in the electronic circuit when the telephone line activates, after the step of applying line power to the electronic circuit.

10. The method according to claim 1, further comprising the step of storing up charge from the telephone line prior to the step of applying telephone line power to the electronic circuit.

11. The method according to claim 10, further comprising the step of dissipating the stored up charge across the electronic circuit when the detected conditioned voltage exceeds a selected voltage level.

12. A method of powering a data access arrangement with a telephone line, the data access arrangement having a CMOS electronic circuit, the method comprising:
  applying a reset signal to the data access arrangement, detecting a conditioned voltage across the telephone line while the telephone line is in an on-hook state,
  powering the data access arrangement with telephone line power when the detected conditioned voltage exceeds a voltage necessary to properly operate the CMOS electronic device, said detected conditioned voltage exceeding the absolute value of one P-channel threshold voltage plus one N-channel threshold voltage in the electronic circuit, and
  turning-off the reset signal to the electronic circuit after powering the data access arrangement.

13. An apparatus for powering an electronic circuit with telephone line power, the apparatus comprising:
  a conditioning circuit situated across the telephone line;
  a voltage detector that measures the conditioned voltage across the conditioning circuit and that generates a Reset signal based on a characteristic of the measured conditioned voltage, said characteristic comprising the detected voltage exceeding the absolute value of one P-channel threshold voltage plus one N-channel threshold voltage in the electronic circuit, and
  a switch, operably coupled with the voltage detector, for applying telephone line power to the electronic circuit in response to the generated Reset signal.

14. The apparatus according to claim 13, wherein the voltage detector includes circuitry for generating the Reset signal when the measured conditioned voltage exceeds a selected voltage.

15. The apparatus according to claim 13, wherein the voltage detector further includes circuitry for limiting the dc current drain from the telephone line through the voltage detector to <1.0 microamps.

16. The apparatus according to claim 13, wherein the apparatus further includes a signal path for operably coupling the Reset signal from the voltage detector to the electronic circuit.

17. The apparatus according to claim 14, wherein the voltage detector further includes circuitry for resetting the electronic circuit until the measured voltage exceeds the voltage necessary to properly operate digital logic in the electronic circuit.

18. An apparatus for powering an electronic circuit with telephone line power, the apparatus comprising:
  a voltage detector that measures the voltage across the telephone line and that generates a Reset signal based on a characteristic of the measured voltage, and
  a switch, operably coupled with the voltage detector, for applying telephone line power to the electronic circuit in response to the generated Reset signal, wherein the voltage detector further includes circuitry for enabling the electronic circuit after the measured voltage exceeds the absolute value of one P-channel threshold voltage plus one N-channel threshold voltage in the electronic circuit.

19. The apparatus according to claim 13, further comprising a electronic charge storage device operably coupled to the switch, such that the storage device accumulates electronic charge when the telephone line power is disconnected from the electronic circuit and such that the storage device provides electronic charge when the telephone line power is applied to the electronic Circuit.

20. The apparatus according to claim 13, further comprising a high impedance resistor connected in series with the electronic circuit for limiting the voltage applied across the electronic circuit.

21. The apparatus according to claim 16, further including a time delay element coupled along the signal path between the voltage detector and the electronic circuit, such that the delay element delays application of the Reset signal at the electronic circuit.

* * * * *